(12) United States Patent
Tallman, Jr.

(10) Patent No.: US 7,917,715 B2
(45) Date of Patent: Mar. 29, 2011

(54) INTERNET-SAFE COMPUTER

(76) Inventor: Leon C. Tallman, Jr., Peoria, IL (US)

( * ) Notice: Subject to any disclaimer, the term of this patent is extended or adjusted under 35 U.S.C. 154(b) by 158 days.

(21) Appl. No.: 11/341,039

(22) Filed: Jan. 28, 2006

(65) Prior Publication Data

US 2007/0180209 A1     Aug. 2, 2007

(51) Int. Cl.
*G06F 12/00*     (2006.01)
(52) U.S. Cl. ............... 711/163; 711/154; 726/26; 713/1
(58) Field of Classification Search .................... 711/163
See application file for complete search history.

(56) References Cited

U.S. PATENT DOCUMENTS

| | | | | |
|---|---|---|---|---|
| 5,519,831 | A * | 5/1996 | Holzhammer | 714/22 |
| 5,537,540 | A | 7/1996 | Miller et al. | |
| 6,049,854 | A * | 4/2000 | Bedarida | 711/153 |
| 6,092,194 | A | 7/2000 | Touboul | |
| 6,578,140 | B1 * | 6/2003 | Policard | 713/1 |
| 6,738,710 | B2 * | 5/2004 | Nagaki | 701/208 |
| 6,804,780 | B1 | 10/2004 | Touboul | |
| 6,880,110 | B2 * | 4/2005 | Largman et al. | 714/38 |
| 6,982,871 | B2 * | 1/2006 | Tran et al. | 361/686 |
| 7,100,075 | B2 * | 8/2006 | Largman et al. | 714/13 |
| 7,146,640 | B2 * | 12/2006 | Goodman et al. | 726/16 |
| 2003/0061504 | A1 * | 3/2003 | Sprigg et al. | 713/200 |
| 2005/0097268 | A1 * | 5/2005 | Vollmer | 711/113 |
| 2005/0251693 | A1 | 11/2005 | Shevchenko | |
| 2005/0268114 | A1 | 12/2005 | Thibadeau | |

* cited by examiner

*Primary Examiner* — Kevin L Ellis
*Assistant Examiner* — Kalpit Parikh
(74) *Attorney, Agent, or Firm* — Valauskas Corder LLC; Benjamin P. Liu

(57) ABSTRACT

The present invention eliminates the possibility of problems with viruses, worms, identity theft, and other hazards that may result from the connection of a computer to the Internet. It does so by creating a new configuration of components within the computer. In addition to commonly used components, two new components are added. These are a secondary hard drive and a secondary random access memory. When the computer is connected to the Internet these secondary components are used in place of their primary counterparts. The primary hard drive is electronically isolated from the Internet, thus preventing Internet contamination of the primary hard drive.

5 Claims, 1 Drawing Sheet

Schematic of Present Invention

Figure 1A: Schematic of Present Invention
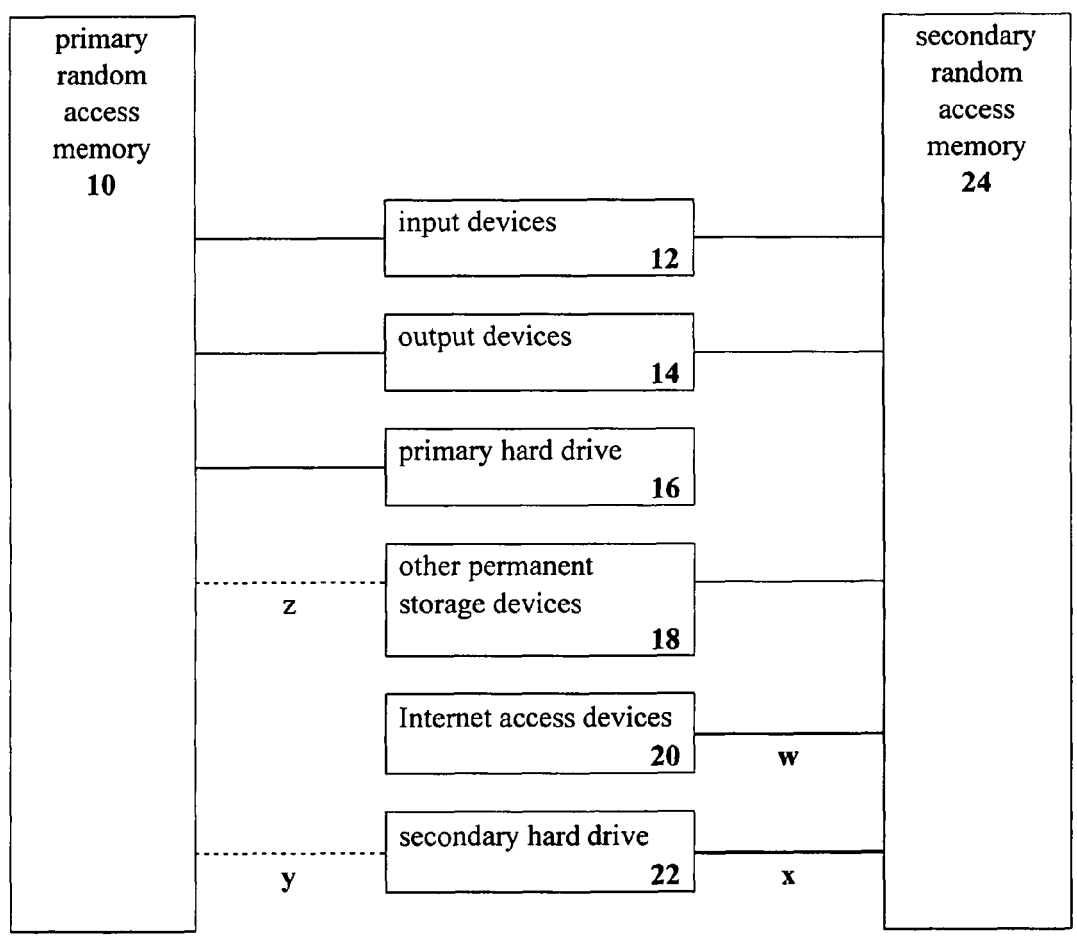

INTERNET-SAFE COMPUTER

BACKGROUND OF THE INVENTION

1. Field of Invention

This invention identifies an arrangement of the major components within a computer that will prevent hard drive contamination from the Internet.

2. Background of the Invention

As used herein the term "personal computer" will be understood to include computers using either the Windows operating system or the Macintosh operating system. Internet applications have become an increasingly popular use for personal computers. Along with benefits provided by the Internet, there are also possible dangers:

(a) Viruses and worms may invade the computer hard drive. This can result in the loss of valuable information that was contained on the hard drive. Repairs to the hard drive may be expensive and time-consuming.

(b) Unscrupulous persons may gain access to personal information that is kept on the hard drive. This can permit identity theft whereby the thief assumes the identity of the victim. Significant financial losses for the victim often result.

The dangers presented by computer connection to the Internet have thus far been addressed through the use of protective software. Improvements in protective software are being met with further sophistication in the methods used by identity thieves and creators of viruses and worms. Protective software may never be a permanent solution. In addition, it is becoming more expensive. The cost of protective software is becoming a significant and increasing part of the total cost of owning a personal computer.

3. Objects and Advantages

The objects and advantages of the present invention are:

(a) To prevent the harmful transmission of information from the Internet to the computer hard drive.

(b) To prevent the harmful extraction of information from the computer hard drive to the Internet.

(c) To provide a configuration of the components in a personal computer that will inherently and permanently provide these advantages.

SUMMARY

In accordance with the present invention, a configuration of major computer components isolates the computer hard drive from the Internet during the entire period that the computer is connected to the Internet.

DETAILED DESCRIPTION

Preferred Embodiment

A preferred embodiment of the present invention is shown on FIG. 1A. Many of the components shown are used in conventional personal computers sold today. These include:

10 random access memory
12 input devices (such as keyboards and mice)
14 output devices (such as display screens)
16 primary hard drive
18 other permanent storage devices (such as CD drives, DVD drives, and others)
20 Internet access devices (modems) or connectors The basic input/output system and the computer operating system manage the interface between the random access memory and the other devices. Since an electronic connection exists between the Internet and the hard drive, the hard drive contamination described above can occur.

The present invention provides the following component changes for use with Internet applications:

(a) Secondary random access memory 24 replaces primary random access memory 10.

(b) Internet access devices 20 are electronically connected to secondary random access memory 24 through connection w. Internet access devices 20 are not electronically connected to primary random access memory 10.

(c) Secondary hard drive 22 replaces primary hard drive 16.

(d) Secondary hard drive 22 is electronically connected to secondary random access memory 24 through connection x. Connection y between secondary hard drive 22 and primary random access memory 10 does not exist while the Internet is in use.

(e) Primary hard drive 16 is connected to primary random access memory 10. It is not connected to secondary random access memory 24.

(f) Input devices 12, output devices 14, and other permanent storage devices 18 are connected to both primary random access memory 10 and secondary random access memory 24.

Operation—Preferred Embodiment

Preparation of secondary hard drive 22 includes copying the basic input/output system and the computer operating system to the secondary hard drive storage medium. Preparation also requires copying Internet-related applications software to the secondary hard drive storage medium. Copying to secondary hard drive 22 will not be permitted if any Internet connection is active. The copying requires a temporary connection y between secondary hard drive 22 and primary random access memory 10. Connection y will be severed once the preparation of secondary hard drive 22 is complete. The secondary hard drive storage medium will remain in use unless and until it is corrupted by Internet applications. The corrupted storage medium will then be destroyed and another will be prepared.

When Internet applications are in use, secondary random access memory 24 and secondary hard drive 22 will be active. When Internet applications are not in use, primary random access memory 10 and primary hard drive 16 will be active. The basic input/output system and computer operating system will be modified to accomplish the switching.

The present invention does not limit the availability of downloads from the Internet. Unintentional downloads in the form of viruses, worms, and security breaches are confined to secondary random access memory 24 and secondary hard drive 22. Powering down of the computer will clear random access memory 24. A corrupted storage medium in secondary hard drive 22 can be destroyed. It can then be replaced with a new storage medium, prepared as explained above. Intentional downloads can be copied to one of the other permanent storage devices 18. From there they can be accessed by primary random access memory 10 and copied to primary hard drive 16. Connection z between other permanent storage devices 18 and primary access memory 10 is severed while Internet applications are in use but is available when Internet connections are terminated.

Conclusions, Ramifications, and Scope of Invention

As long as an electronic connection exists between the Internet and the principal hard drive of a computer, the potential exists for corruption of the hard drive. This invention eliminates that electronic connection and ensures the safety of the hard drive.

The selection of the device to be used as the secondary hard drive will be governed by the need for sufficient capacity to accommodate the operating system and selected applications. Also, the storage medium used by the secondary hard drive must be easy and inexpensive to remove and replace. At the present time a DVD drive appears to be the best choice. As storage technology continues to improve, other devices may offer advantages.

The present invention describes two parallel environments, one for Internet applications and one for non-Internet applications. Safety for the principal hard drive results from the existence of the two parallel environments. The method of switching between Internet and non-Internet applications provides opportunity for additional development but such improvements would still depend on the present invention.

An alternative to copying the basic input/output system, the computer operating system and Internet application software to the secondary hard drive would be to copy them to the secondary random access memory. Reductions in the cost of random access memory may eventually favor this approach. However by this approach the essential parallel environment concept of the present invention is maintained.

What is claimed is:

1. A method of operating a computer connectable to the Internet, comprising:
    establishing a temporary connection between a primary random access memory and a secondary hard drive at a time when the computer is not connected to the Internet;
    Copying an operating system from a primary hard drive to the secondary hard drive via the primary random access memory temporarily connected to the secondary hard drive;
    copying internet-related application software contained on the primary hard drive to the secondary hard drive via the primary random access memory temporarily connected to the secondary hard drive;
    severing the temporary connection between the primary random access memory and the secondary hard drive;
    wherein the temporary connection is only maintainable when the computer is not connected to the Internet;
    downloading files of known integrity from the Internet to a secondary random access memory in said computer;
    transferring the downloaded files from the secondary random access memory to a permanent storage device;
    disconnecting the computer from the Internet;
    accessing the downloaded files from the permanent storage device via the primary random access memory;
    copying the downloaded files to the primary hard drive;
    when connecting the computer to the Internet, using the secondary hard drive and the secondary random access memory and not using the primary hard drive and the primary random access memory;
    when disconnecting the computer from the Internet, using the primary hard drive and the primary random access memory and not using the secondary hard drive and the secondary random access memory;
    upon corruption of the secondary hard drive, powering down the computer erasing the secondary random access memory; and
    removing the storage medium from the secondary hard drive of the computer and replacing the removed storage medium with a new storage medium.

2. A method of operating a computer connectable to the Internet, said computer having separate primary and secondary hard drives, and separate primary and secondary access memories, comprising the steps of:
    establishing a temporary connection between said primary and secondary random access memory only at a time when the computer is not connected to the Internet;
    copying an operating system from said primary hard drive to the secondary random access memory via the primary random access memory to the secondary random access memory during said temporary connection;
    copying internet-related application software contained on the primary hard drive to the secondary random access memory via the primary random access memory to the secondary random access memory during said temporary connection; and
    thereafter severing the temporary connection between the primary random access memory and the secondary random access memory;
    wherein the temporary connection is only maintainable when the computer is not connected to the Internet;
    erasing the secondary random access memory by powering down the computer when determining that the secondary random access memory is corrupted; and
    replacing the secondary hard drive in the event of corruption thereof,
    wherein the secondary random access memory replaces primary random access memory when the computer is connected to the Internet.

3. The method of claim 2, further comprising:
    connecting the computer to the Internet while severing the primary random access memory from the secondary hard drive and activating the secondary random access memory,
    wherein the secondary random access memory and secondary hard drive are connected and active while the computer is connected to the Internet.

4. The method of claim 3, further comprising:
    activating the primary hard drive and the primary random access memory when disconnecting the computer from the Internet and severing said secondary random access memory from said primary random access memory.

5. A method of operating a computer connectable to the Internet, comprising:
    establishing a temporary connection between a primary random access memory and a secondary random access memory at a time when the computer is not connected to the Internet;
    copying an operating system from a primary hard drive to the secondary random access memory via the primary random access memory temporarily connected to the secondary random access memory:
    copying Internet-related application software contained on the primary hard drive to the secondary random access memory via the primary random access memory temporarily connected to the secondary random access memory; and
    severing the temporary connection between the primary random access memory and the secondary random access memory;
    wherein the temporary connection is only maintainable when the computer is not connected to the Internet;
    upon connecting the computer to the Internet, severing the primary random access memory from a secondary hard drive and activating the secondary random access memory;
    downloading files of known integrity from the Internet to the secondary random access memory and transferring the downloaded files from the secondary random access memory to a permanent storage device;

disconnecting the computer from the Internet and accessing the downloaded files from the permanent storage device via the primary random access memory, activating the primary hard drive and the primary random access memory, and severing the secondary random access memory and copying the downloaded files to the primary hard drive; and upon determining that the secondary random access memory is corrupted;

powering down the computer and erasing the secondary random access memory.

* * * * *